May 12, 1931.  F. N. CONNET  1,805,236
VENTURI METER
Filed Oct. 25, 1927
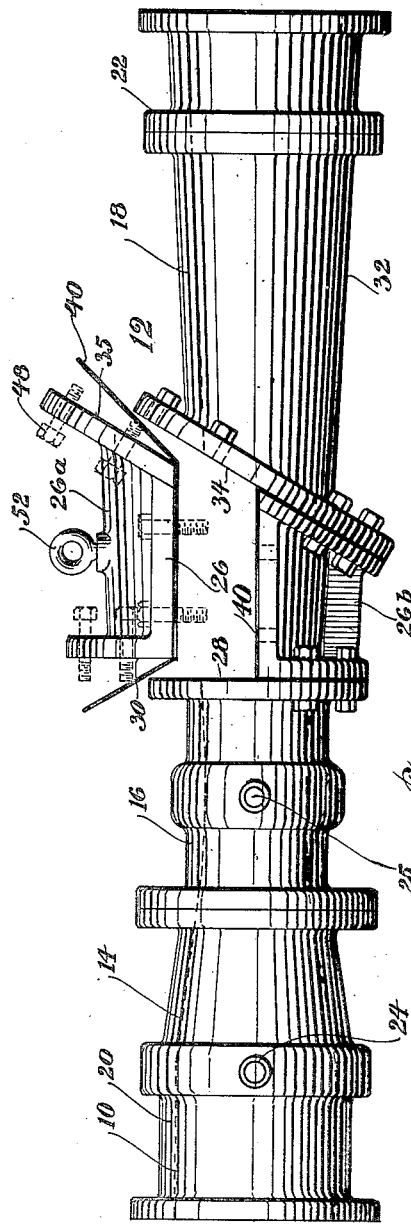
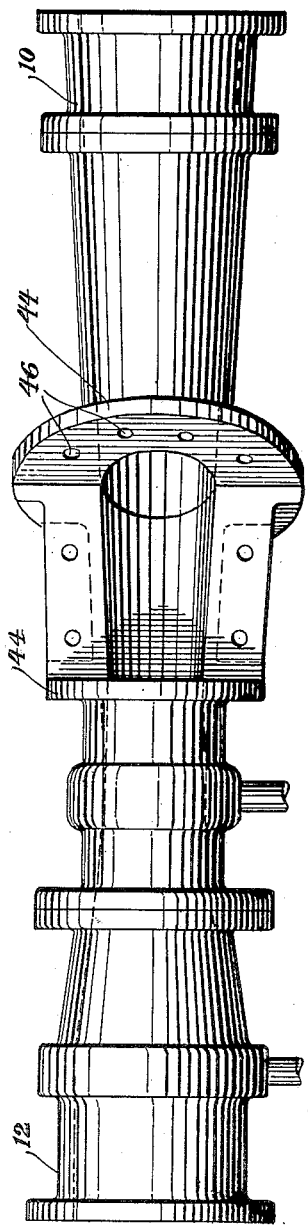
INVENTOR.
Frederick N. Connet
BY Thomas A. Jenkins Jr.
ATTORNEYS.

Patented May 12, 1931

1,805,236

UNITED STATES PATENT OFFICE

FREDERICK N. CONNET, OF PROVIDENCE, RHODE ISLAND, ASSIGNOR TO BUILDERS IRON FOUNDRY, OF PROVIDENCE, RHODE ISLAND, A CORPORATION OF RHODE ISLAND

VENTURI METER

Application filed October 25, 1927. Serial No. 228,678.

My invention relates to Venturi meters and includes a removable section, preferably a wedge section and preferably a longitudinally split half section located adjacent the throat for cleaning and inspection purposes.

In Venturi meter tubes, particularly those adapted for use in sewerage disposal plants and in gas lines, much difficulty has been experienced in the clogging or coating of the restricted throat portion. Particularly in gas lines, tar, and in smelter plants, the sticky dust from smeltering, have been very apt to so coat or clog the throat that the meter has become inaccurate. As a Venturi tube is depended on for the accurate measurement of fluids flowing therethrough, it is desirable that it be made readily available for rapid inspection. Whereas, in very large tubes, man-holes, or hand holes for inspection or cleaning purposes have been provided, these have not been very practical, and so far as I am aware no means have been provided for the ready inspection and cleaning of relatively small Venturi meter tubes. Even in large tubes it is more preferable to have the removable section adjacent the throat as its removal permits the admission of much more desired light therethrough.

A further object of my invention is to construct the removable section or half section of wedge shape so that it may be pulled up or knocked out preferably upwards in a more easy fashion than hitherto and without destroying the gasket if one be employed. If the upper half of the section only be removable, the lower half of the section spaces the adjacent pipe section so that no force will be required to open or spread apart the flanges thereof.

These and such other objects of my invention as may hereinafter appear will be best understood from a description of the accompanying drawings which illustrate an embodiment thereof.

In the drawings, Fig. 1 is a side elevation of a Venturi meter tube equipped with my invention suitably attached to a conduit with the upper wedge shaped half section partially removed therefrom.

Fig. 2 is a plan view of the elements shown in Fig. 1, with the upper half section with its cooperating gaskets and bolts removed.

Fig. 3 is a face view of the outer end of the removed wedge shaped outer half section.

Fig. 4 is a plan view of the gasket normally used with my invention.

In the drawings, wherein like characters of reference indicate like parts throughout, 10 generally indicates a suitable conduit having the Venturi meter tube 12 suitably interposed therein. The Venturi meter tube is provided with the usual converging section 14, throat 16 and diverging section 18, the section 14 converging from the inlet 20 and the diverging section 18 diverging to the outlet 22. The inlet 20 and throat 16 are provided with the usual pipe connections 24 and 25 which lead to a suitable metering device to record the differential. The throat section 16 is suitably attached to the diverging portion 14, and in order that the removable section 26 may be closely adjacent the throat for cleaning and inspection purposes, is provided with the flat outer end 28 adapted to abut the flat inner end 30 of the removable section 26. In the embodiment shown I preferably construct the diverging portion of the meter 18 of three sections, the section 32 suitably attached in any suitable manner to the conduit 10 at the outlet 22 of the Venturi tube having an inner end 34 inclined so as to permit the insertion of the wedge shaped section 26 between said inclined end 34 and the outer end 28 of the throat. The outer end 28 of the throat is preferably made flat in a vertical plane in order that the removable section may be more closely adjacent the throat 16. It will be obvious to those skilled in the art that the outer end of the throat may be inclined so as not to be in a vertical plane if desired, although the preferred embodiment of my invention is that above described and shown in the drawings. As explained, the inner end 34 of the outer diverging portion 32 is preferably inclined upwardly toward the outer end in order that the wedge shaped section 26 may be more readily removed therefrom by lifting it upwards. The wedge shaped section 26 is as stated provided with the inner end 30 preferably vertically flat as explained adapted to abut the outer end 28 of the throat 16 and the inclined outer end 35 adapted to abut the inclined inner end 34 of the diverging portion 32. In order that the inclined outer end 35 of the wedge shaped section 26 may be complementary to the inner end 34 of the diverging section 32, it is preferably inclined upwardly towards the outlet to provide the wedge. The removable wedge shaped section 26 is preferably longitudinally split into the removable upper section 26$^a$ and the removable lower section 26$^b$ substantially centrally thereof.

The wedge shaped sections described above readily permit the use of the gaskets 40 having the suitable bolt holes 42 therein adapted to surround the edges of the abutting sections. The usual flanges 44 of the sections are provided with the suitable bolt holes 46 for the insertion of the bolts 48 therein to attach them to each other, the sections 26$^a$ and 26$^b$ being provided with the bolt holes 46 adjacent their longitudinal flanges 44 for attachment to each other.

As stated hitherto, the wedge shaped section 26 may consist of an entire section of the pipe but preferably as shown comprises the two longitudinally split half sections 26$^a$ and 26$^b$. The upper section 26$^a$ is preferably removable but if desired the lower section 26$^b$ may be made integral with the throat 16 and outer diverging section 32. In view of the fact that the lower wedge section 26$^b$ is normally not removed, it is apparent that it will function to space the sections 16 and 32 so that there will be no strain necessary to separate the sections for the removal of the upper removable section 26$^a$.

To remove the upper removable section 26$^a$, it is merely necessary to remove the bolts 48 attaching it to the flanges 44 of the sections 16, 26$^b$ and 32 and suitably lift it up by means of the handle 52 from the lower wedge section 26$^b$, the gasket 40 readily spreading out as the section is being detached, without any distortion thereof. After the throat has been suitably inspected or cleaned, the old gasket 40 or a new one may be inserted in position adjacent the flanges 44, the removable section 26$^a$ reinserted in position thereon and the bolts 48 suitably secured within the bolt holes 46.

Whereas my invention broadly comprises the use of a removable section, preferably a part section substantially adjacent the throat of a Venturi tube or other restricted nozzle for cleaning and inspection purposes, located in any portion of the tube or conduit, I preferably place it behind the throat immediately adjacent thereto so as to be out of the way of the usual inlet and throat connections 24 and 26, which also facilitates the use of steam jackets for the inlet and throat sections which is necessary in gas meters where a large amount of tar is apt to accumulate. Due to the peculiar inherent structure of a removable upper half section it is apparent that all pressure and force exerted on the gaskets will be immediately eliminated as soon as the bolts are loosened, which novel feature permits the removal of the gasket 40 uninjured.

It will be obvious to those skilled in the art that applicant's invention may be embodied in a variety of ways to obtain the advantages of the invention, and that applicant's invention has been shown only in its preferred form. It is to be understood, therefore, that by the term "at the throat of the Venturi tube" or the equivalent term as used in the claims, it is intended to cover and include such various positions of the wedge member in the constricted portion of the Venturi tube as may properly be included in the scope of the claims.

It will be understood by those skilled in the art that by the use of a removable wedge section in the constricted portion of the Venturi tube, the wedge section may be removed for cleaning purposes and replaced without disturbance of the adjacent converging and diverging sections, and without modifying the constants of the meter.

It is understood that my invention is not limited to the embodiment shown and that various deviations may be made therefrom without departing from the spirit and scope of the appended claims.

What I claim is:

1. A Venturi meter tube particularly adapted for measuring fluids in which deposition or clogging takes place requiring clearing of the meter at intervals, which comprises a converging tube section, a diverging tube section, and a throat section, said Venturi tube having a removable wedge portion at the throat thereof, whereby said portion may be readily removed and replaced without the disturbance of the adjacent sections of the meter.

2. A Venturi meter tube particularly adapted for measuring fluids in which gradual deposition or clogging takes place, which comprises a converging tube section, a diverging tube section, and a throat section, the said Venturi tube having a removable wedge member at the throat thereof, comprising a plurality of parts, one of said parts being in the form of a wedge and removable from the said member without disconnecting other parts thereof.

3. A Venturi meter tube particularly adapted for measuring fluids in which gradual deposition or clogging takes place, which comprises a converging tube section, a diverging tube section, and a throat section, the said Venturi tube having a wedge member at the throat thereof, longitudinally split into a plurality of parts, one of said parts being in the form of a wedge and removable from the said wedge member without disconnecting other parts thereof.

4. A Venturi meter tube adapted to be interposed in a pipe, comprising a converging section connected to one pipe end, a diverging section connected to the other pipe end, and a restricted throat portion of substantially less diameter than said pipe interposed between said converging and diverging sections, a split wedge shaped section comprising a plurality of parts interposed in said Venturi tube with at least one end of the said wedge-shaped section of substantially the diameter and size of said restricted throat section, and means to detachably secure at least one part of the wedge-shaped section to a longitudinally adjacent Venturi tube part and to the other portion of the wedge-shaped section, whereby the entire wedge section or one part thereof may be detachably removed for cleaning or inspection of said restricted throat section.

In testimony whereof I affix my signature.

FREDERICK N. CONNET.